Feb. 10, 1925.
E. VERSTRAETE
1,526,192
TOOL HOLDER
Filed June 14, 1923 4 Sheets-Sheet 1
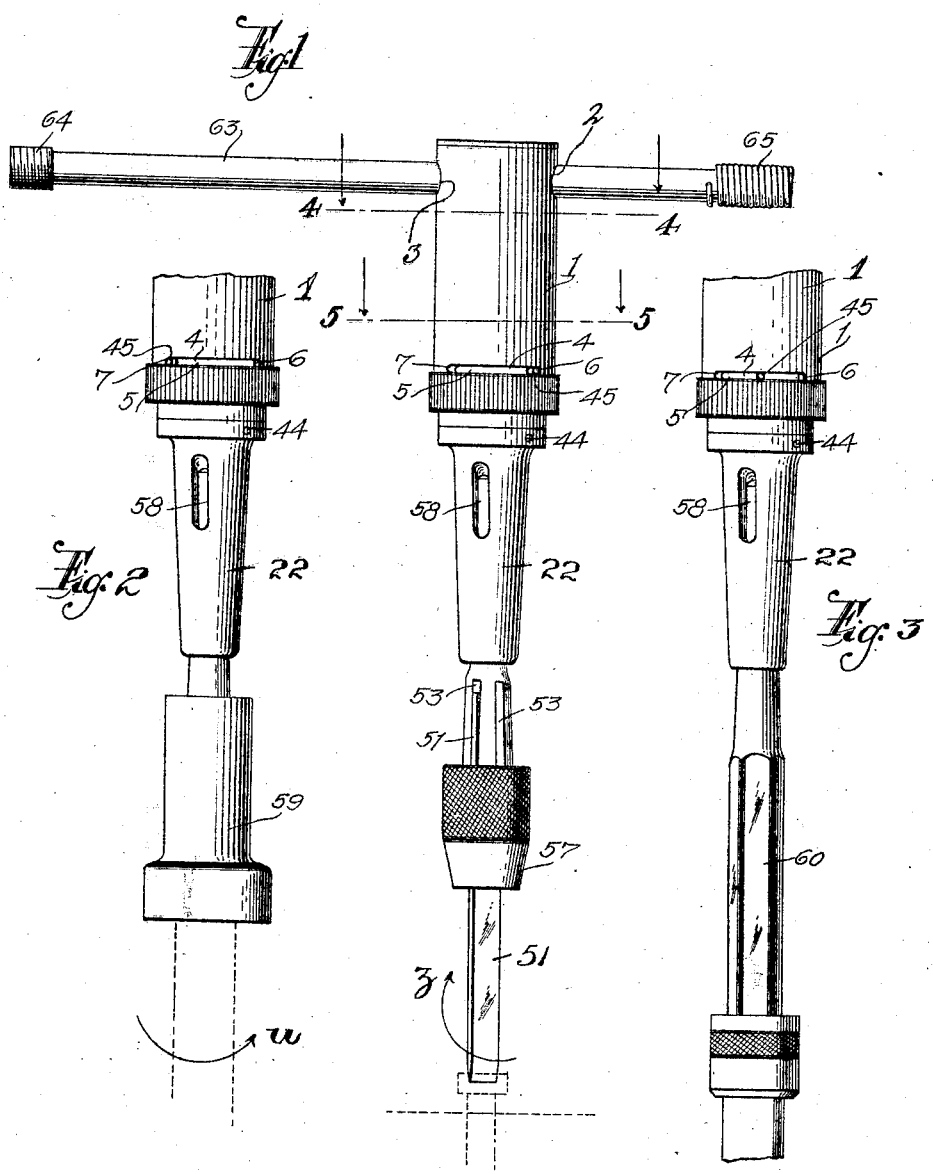

Feb. 10, 1925.
E. VERSTRAETE
1,526,192
TOOL HOLDER
Filed June 14, 1923 4 Sheets-Sheet 2
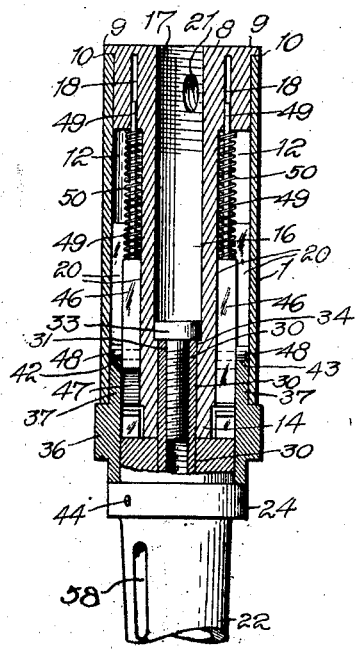
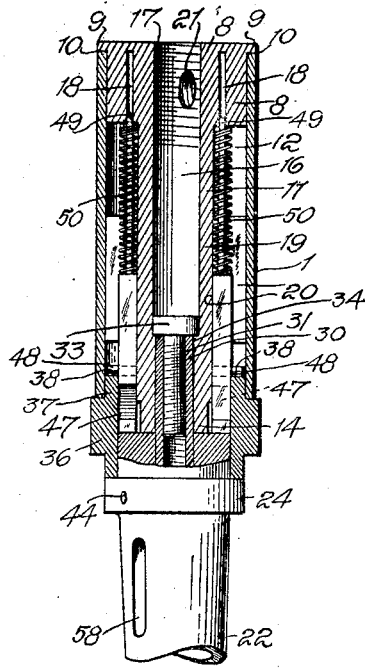
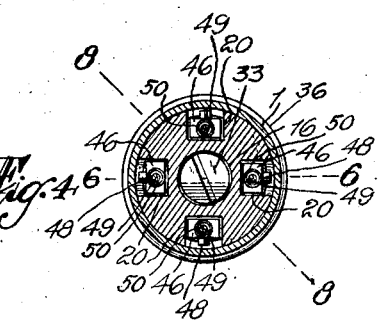
INVENTOR:
Edmond Verstraete,
BY
Fraentzel and Richards
ATTORNEYS.

Feb. 10, 1925.　　　　　　　　　　　　　　　　1,526,192
E. VERSTRAETE
TOOL HOLDER
Filed June 14, 1923　　　　4 Sheets-Sheet 3
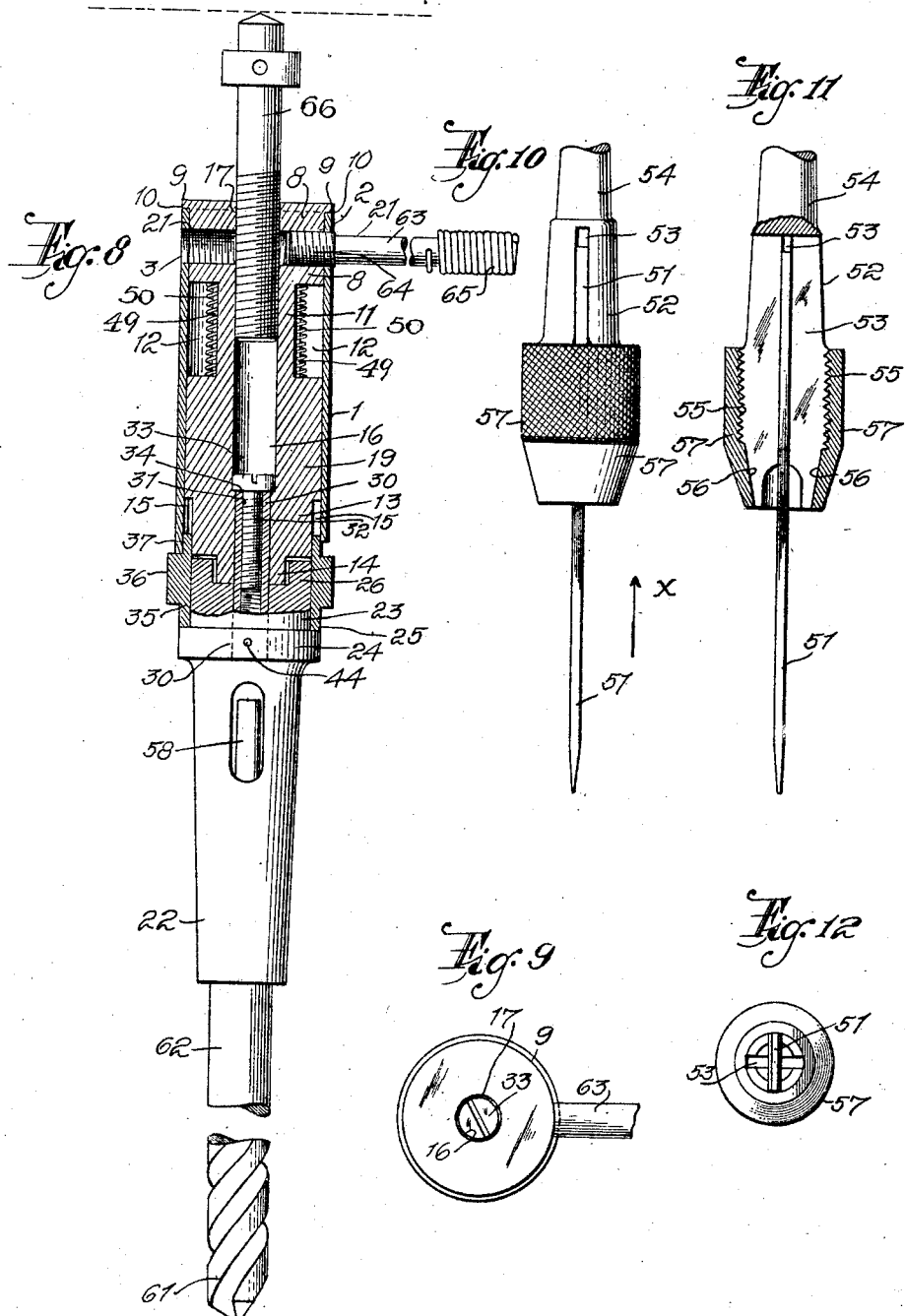
INVENTOR:
Edmond Verstraete,
BY
Fraentzel and Richards,
ATTORNEYS

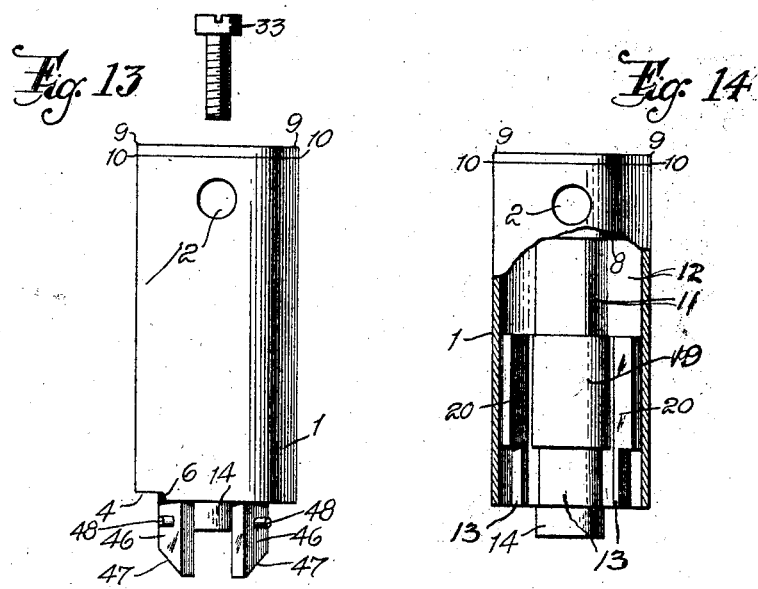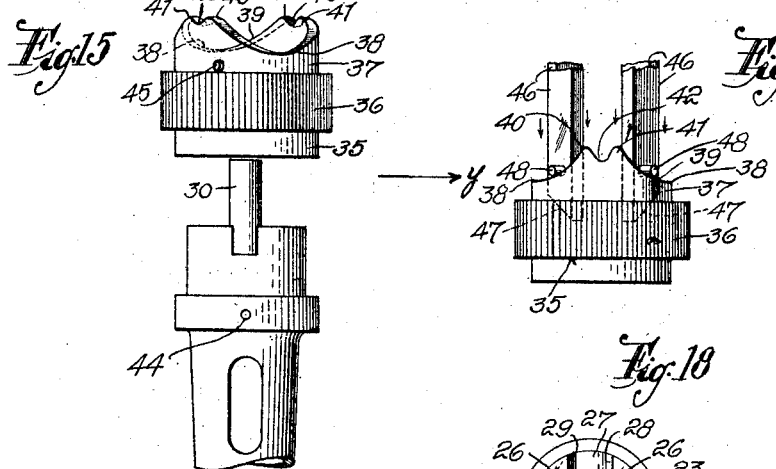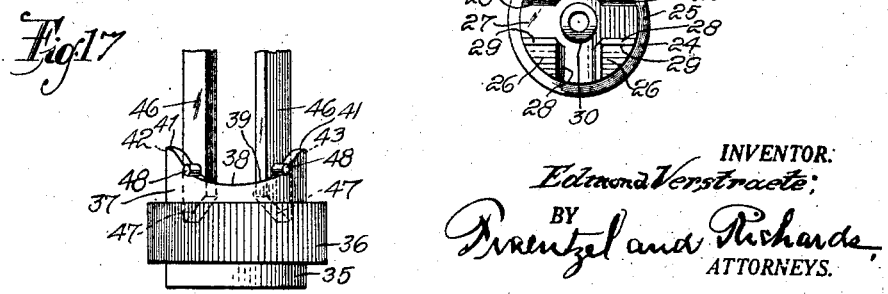

Patented Feb. 10, 1925.

1,526,192

UNITED STATES PATENT OFFICE.

EDMOND VERSTRAETE, OF BELLEVILLE, NEW JERSEY.

TOOL HOLDER.

Application filed June 14, 1923. Serial No. 645,273.

*To all whom it may concern:*

Be it known that I, EDMOND VERSTRAETE, a citizen of the United States, residing at Belleville, in the county of Essex and State of New Jersey, have invented certain new and useful Improvements in Tool Holders; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in that class of implements known in the art as tool-holders, and, the present invention has reference, more particularly, to a novel construction of ratchet-mechanism for a tool-holder, adapted for use as a screw-driver, drill, or thread-cutter, (the latter either in the form of a tap or a die), with means for setting the ratchet-mechanism in a manner that the rotatable element of the tool-holder may be oscillated to the left or to the right, as may be desired, or that the variously assembled members of the tool-holder may have a fixed non-rotative relation to each other, thus permitting the tool to be used in the manner of the usual hand screw-driver or similar tool in which there are no rotatably connected members.

The present invention, therefore, has for its principal objects to provide a novel and simply constructed tool-holder of the general character hereinafter more fully set forth, and a novel, strong and effectively operating ratchet-mechanism for the same, the members or parts of which are readily assembled, are simple in operation, are reduced to a minimum, and when in their assembled relation may be easily and quickly set so as to produce the different movements of the tool, that may be desired, in a most effective and efficient manner.

Other objects of the present invention not at this time more particularly enumerated will be clearly understood from the following detailed description of the present invention.

With the various objects of the said invention in view, the invention consists, primarily in the novel tool-holder and ratchet-mechanism therefor, and hereinafter more fully set forth; and, the invention consists, furthermore, in the novel arrangements and combinations of the various devices and parts, as well as in the details of the construction of the said parts, all of which will be more fully described in the following specification, and then finally embodied in the clauses of the claims which are appended to and which form an essential part of the said specification.

The invention is illustrated in the accompanying drawings, in which:—

Figure 1 is an elevation of a tool-holder made according to and embodying the principles of the present invention, with its ratchet-mechanism set so that the tool-receiving socket-member of the holder in operating the device is moved from right to left with relation to the rotatable member of the holder, the rotatable member being adapted to be returned to the initial actuating position for again actuating the tool-receiving socket; Figure 2 is a similar view, showing fragmentary portions of the tool-holder, with the ratchet-mechanism of the holder set, so that the members thereof are adapted to be actuated in directions reversely from those of the members when set as indicated in Figure 1 of the drawings; and Figure 3 is a view, similar to said Figure 2, representing the ratchet-mechanism set at a point, whereby the tool-receiving socket and the rotatable member of the tool-holder will have a rigidly connected or fixed relation to each other, said several figures showing in connection therewith the application of different tools to the tool-receiving socket.

Figure 4 is a horizontal section of the tool-holder, said section being taken on line 4—4 in said Figure 1; and Figure 5 is a similar section taken on line 5—5 in said Figure 1.

Figure 6 is a transverse vertical sectional representation, taken on line 6—6 in said Figure 4, with the ratchet-mechanism set, when the tool-holder is capable for action, as indicated in Figure 1; and Figure 7 is a transverse vertical sectional representation, taken on line 7—7 in said Figure 5, with the ratchet-mechanism set, when the tool-holder is capable for action, as indicated in Figure 2.

Figure 8 is a transverse vertical sectional representation, taken on line 8—8 in said Figure 4; and Figure 9 is a top-end view of the tool-holder.

Figure 10 is an elevation of a chuck for the reception of a blade in the shape of a screw-driver, adapted for use with the tool-holder; Figure 11 is a transverse vertical section of the same; and Figure 12 is an end view of the parts represented in said Figures 10 and 11, looking in the direction of the arrow *x* in said Figure 10.

Figures 13, 14, 15 and 16 are detail views of the members used with, and shown in said figures, in connection with the ratchet-mechanism of the tool-holder; Figure 17 is a view of the parts represented in said Figure 16, looking in the direction of the arrow *y* in said Figure 16; and Figure 18 is an end view of the tool-receiving socket or stock used with the tool-holder.

Similar characters of reference are employed in all of the said above described views, to indicate corresponding parts.

Referring now to the said drawings, the reference-characters 1 indicates a main tubular element, in the form of an open-ended cylinder, of any suitable length and desirable cross-area, as will be evident, the said cylinder being provided near its upper open end-portion with oppositely located openings, as 2 and 3, and along its lower marginal edge 4, the said cylinder is suitably cut away, for a desired distance, to provide a pin or stud-receiving space 5 and with the end-stops 6 and 7. Within said main tubular element or cylinder 1 is a core which comprises an upper cylindrical member 8 snugly fitted into the upper portion of the said tubular member or cylinder 1, as shown in Figures 6, 7, 8 and 14 of the drawings, the said member 8 being also provided with an annular flange or off-set, as 9, conforming to and fitting directly upon the marginal edge-portion 10 of the upper open-ended portion of the tubular element or cylinder 1, so as to provide a closure for said open end, as will be clearly evident. The said core is also annularly reduced, so as to provide a shank-portion 11, which provides with the surrounding wall of the tubular element or cylinder 1 an annular space, as 12. At its lower end-portion, the said core has another reduced portion, as 13, which is still further reduced, as at 14, the said last-mentioned reduced portions providing with the surrounding wall of the tubular element or cylinder 1 another annular space, as at 15.

Extending longitudinally through the said core is a central duct 16, the upper portion of which may be screw-threaded, as at 17. As will be seen from an inspection of Figures 6 and 7 of the drawings, the upper cylindrical member 8 of the core is also made with a number of longitudinally extending guide-ducts 18, usually four of such ducts being employed, and the lower ends of the said ducts 18 being in communication with the annular space 12, as shown.

The cylindrical portion 19, as well as the reduced portion 13, of said core, are longitudinally slotted, as at 20, said slots providing suitable guide-ways, which are in alinement with the said ducts 18, and the upper open end-portions of which are in communication with the annular space 12. The upper cylindrical member 8 is also provided with laterally arranged openings, as 21, in alinement with the oppositely located holes or openings 2 and 3 in the opposite sides of the main tubular element or cylinder 1, as shown more particularly in Figure 8 of the drawings. The said openings 21 and the holes 2 and 3 may also be internally screw-threaded, as indicated in said Figures 6, 7, and 8 of the drawings.

The reference-character 22 indicates a tubular tool or chuck-receiving stock, formed near its upper end-portion with a cylindrical head or enlargement 23 and an annular flange 24, which provides an annular off-set or shoulder 25. Upon its upper flat surface, the said cylindrical head or enlargement 23 is made with a series of upwardly projecting lugs, as 26, corresponding in number to the number of the previously mentioned ducts 18 and guide-ways 20, the said lugs 26 being marginally located with relation to the cylindrical head or enlargement 23, being of a triangular configuration, and being of such size and shape, so that diammetrically disposed spaces, as 27, will be located between the respective lugs 26, substantially as shown in Figure 18 of the drawings. The marginal edge-portions 28 and 29 of the respective lugs 26 are also usually chamfered in a manner, as indicated in said Figure 18. Extending in an upward direction, and centrally from the upper flat surface of the said head or enlargement 23 is a tubular member or stud 30, which is internally screw-threaded, as at 31, the said tubular member or stud 30 being fitted into the lower portion of the central duct 16 of the previously mentioned core, with the reduced portion 14 of the said core disposed centrally between the lugs 26. The various elements, just described are maintained in their assembled relation by means of a screw 32 which is screwed into the internally screw-threaded portion 31 of the tubular member or stud 30, with the head 33 of said screw 32 resting directly upon the upper edge of said tubular member or stud 30 and also upon an annular off-set or shoulder 34 within said central duct 16, as will be clearly understood from an inspection of Figures 6, 7 and 8 of the drawings.

Concentric with the previously mentioned enlargement or head 23 of the tubular tool or chuck-receiving stock 22, and oscillatorily disposed upon the annular off-set or shoulder 25 of the flange 24 is a sleeve 35 formed with a serrated or nurled manipulating portion, as 36, and an upwardly extending wall 37, formed as will be seen from an inspection of Figures 15, 16 and 17, with the oppositely disposed high-points 40 and 41, which are respectively provided with the receiving depressions 42 and 43, shown in said Figures 15 and 16.

The previously mentioned tubular member or stud 30 is secured in its fixed position, with relation to the head or enlargement 23 of the stock 22 by means of a pin 44, although it will be understood that other suitable means may be employed for securing the said tubular member or stud 30 in its fixed position.

In this manner, while the head or enlargement 23 of the tool-receiving stock 22 is oscillatorily disposed within the sleeve 35, and also with relation to the reduced portion 14 of the main core, the said sleeve 35, with its annular shoulder 37 disposed in the annular space 15 is also independently rotatably or oscillatorily disposed, with relation to the said head or enlargement 23, for setting the said cam-sleeve 35, in a manner and for the purposes to be presently more fully described. The rotary or oscillatory movement of the sleeve 35, when actuated by the operator, for setting purposes, is limited by a pin or stud 45 extending from the upwardly extending wall 37 into the cut away portion 4 of the main cylinder 1, and adapted to be brought into arrested engagement with either of the end-stops 6 and 7, substantially as indicated in Figures 1 and 2 of the drawings.

Slidably disposed in each previously mentioned longitudinally extending slot 20 of the core is a dog 46, the lower end-portions of the said dogs being angularly formed or chamfered, as at 47, in a manner as indicated in Figures 6, 7, 13, 16 and 17, the angular or chamfered portions 47 of the adjacent dogs being arranged so that they are presented toward each other, as shown more particularly in said Figure 17, the said angular or chamfered end-portions of said dogs extending either into the spaces 27 of the previously mentioned head or enlargement 23 of the tool or chuck-receiving stock 22, at the opposite end-portions of the respective spaces, or being adapted to ride upon and over the lugs 26, in a manner and for the purposes to be hereinafter more fully described. Extending laterally and outwardly from the respective dogs 46 are supporting pins or studs 48 which ride upon the cam-surfaces or edges 38 and 39, or may be made to drop into the receiving depressions 42 and 43 of the actuating sleeve 35.

Connected with and extending in upward directions from the upper end-portions of the respective dogs 46 are suitably formed rods or stems, as 49, which extend through the annular space 12, and have their upper end-portions disposed and freely movable in the guide-ducts 18 of the cylindrical member 8 of the core, substantially as shown in Figures 6 and 7 of the drawings. Encircling the said rods or stems 49, with their respective ends in engagement with the lower surface-portions of the said cylindrical member 8 and with the upper end-portions of the respective dogs 46 are compressible coil-springs 50, the main purpose of said springs being to cause a positive riding engagement of the respective pins or studs 48 of the respective dogs 46, upon the various portions 38, 39, 40, 41, 42 and 43 of the sleeve 35, as will be clearly understood from an inspection of the several figures of the drawings, and for the purposes to be presently more fully described.

As will be evident from an inspection of the several figures of the drawings, various tools may be detachably connected with the tubular tool or chuck-receiving stock 22.

Thus, when the tool-holder is to be used as a screw-driver, a screw-driving blade, as 51, see Figures 1, 10, 11 and 12, is inserted in the correspondingly slotted receiving portions 53 of a body-member 52, said member being provided at one end with a shank or stem 54 which is suitably tapered, and is adapted to be inserted in the correspondingly tapering tubular portion of the stock 22, as indicated in said Figure 1 of the drawings. As shown in Figure 11, the said body-member 52 is externally screw-threaded, as at 55, and has a lower tapering end-portion 56, for the reception thereon of an internally screw-threaded clamping or binding sleeve 57, which when screwed up tightly, securely maintains the said screw-driving blade 51 in its operative position, as will be clearly evident. At a suitable location, near its upper portion, the walls of the said stock 22, are provided with oppositely located openings 58, which are preferably elongated, as shown, and up to which the end-portion of the previously mentioned shank or stem 54 extends and terminates, so as to leave a space above the free end of the said shank or stem for the insertion of a tool or the like through the said openings 58 and in contact with said free end of the shank or stem 54 when it is desired to disconnect the tool-holding chuck from the stock 22 of the main tool-holder, as will be clearly understood.

Of course it will be evident, that in lieu of the receiving chuck just described, screw-thread cutting tools as 59 and 60, see Figures 2 and 3 of the drawings, may be operatively connected in a similar manner with the tubular stock 22; or, as indicated in Figure 8, the stem or shank 62 of a drill 61, or other similar tool may be suitably inserted in the tubular stock 22, so as to be operatively connected with the main tool-holder, as will be clearly understood.

In connection with the main tubular element or cylinder 1, when the tool-holder is to be used as a screw-driver, or the like, a bar or rod, as 63, having preferably at one end a screw-threaded portion 64, and at its other end a removable retaining member 65, preferably made in a form, similar to a helically wound or coiled spring, as represented in Figures 1 and 8 of the drawings, is passed into and through the alined openings 2 and 3 of the cylinder 1 and the openings 21 of the member 8 of the core which is disposed within said cylinder 1, in the manner indicated in said Figure 1; but, when the tool-holder is to be employed as a ratchet-device, and where greater operating or driving power is necessary, as in the case of operating a drill, as indicated in Figure 8, then by removing the retaining member 65 from the bar or rod 63, withdrawing said bar or rod from the openings in the main cylinder and core, and screwing the screw-threaded portion 64 into the alined opening of the cylinder or core, located at one side of the central duct 16 of the core, a greater leverage and consequently increased operating power is obtained, so that the device is perfectly operable as a ratchet-tool. In case, the device is thus to be used as a ratchet-tool for use with a drill or boring tool, the internally screw-threaded portion 17 of the above-mentioned bore adapts itself especially for the reception of the usual adjusting stud, as 66, for the usual and proper positioning of the tool-holder, during the drilling or boring operation.

The operation of the device will readily be understood from an inspection of the several figures of the drawings, and more especially from Figures 13 to 18 inclusive; and, according to the positioning of the sleeve 35, that is, when the sleeve 35 is moved from right to left, thus bringing the pin 45 into the position shown in Figure 1, two of the oppositely located dogs 46 will remain in the respective spaces 27 of the head or enlargement 23 of the stock 22, so that the assembled members will all turn, as a single unit in the direction of the arrow z in Figure 1 of the drawings, with the intermediately disposed dogs 46 sufficiently raised above the lugs 26, so as not to interfere with this movement, and the chamfered or angular portion 47 of the dogs, permitting a return rotary motion of the cylinder 1, and the parts intimately connected therewith, while the stock 22 and the tool connected will remain in their non-rotatable position. When thus set, the lifting pins 48 of the oppositely located raised dogs 46 are, respectively, in registration with the depressions or recesses 42 and 43 of the cam-wall 37 of the sleeve 35, while the lifting pins 48 of the other set of oppositely located dogs 46 will rest upon the lowest portions of the cam-surfaces or edges 38 and 39 of the said cam-wall 37. By turning the sleeve in the opposite direction that is from left to right, thus bringing the pin 45 into the position shown in Figure 2, the two oppositely located and previously lowered dogs 46 become raised and the intermediately located and previously raised dogs become lowered, so that the reverse rotary movements of the several element, as indicated by the arrow u in said Figure 2 may take place.

Should it be desired, at any time, to maintain a non-rotative fixed relation of the cylinder 1 and its parts, with the stock 22, all that is necessary is to move the sleeve 35 into a position, so that the pin 45 is centrally located in the cut-away portion 4 of the cylinder 1, as indicated in Figure 3 of the drawings, in which case all of the pins 48 of the several dogs 46 remain located upon the cam-surfaces 38 and 39 of the cam-wall 37 of the sleeve 35, so that the springs 49 connected with the various dogs, will maintain all of said dogs in their lowered relations, with the chamfered or angular end-portions 47 of the said dogs extending into the spaces 27 between the respective lugs 26, so that any independent rotary movements of either parts, in either direction, are impossible.

From the foregoing description of the present invention it will be clearly evident that I have produced a novel and simply constructed tool-holder, the parts of which have been reduced to a minimum, and are of such a construction and arrangement that a strong and powerful, as well as an efficient ratchet-mechanism has been produced.

Of course, I am fully aware that changes may be made in the general arrangements and combinations of the various devices and parts, as well as in the details of the construction of the said parts, without departing from the scope of the present invention as set forth in the foregoing specification, and as defined in the clauses of the claims which are appended thereto. Hence, I do not limit my present invention to the exact arrangements and combinations of the several devices and parts as described in the said specification, nor do I confine myself to the exact details of the construction of the said parts, as illustrated in the accompanying drawings.

I claim:—

1. A tool-holder of the character herein set forth, comprising a main cylindrical body, a core fitted within said body, said core being provided with a centrally disposed and longitudinally extending duct and a lower reduced portion providing with said cylindrical body an annular space, a tool-receiving stock, means within the longitudinally extending duct of said core for operatively connecting the core and the cylindrical body with the tool-receiving stock, a setting sleeve surrounding a portion of said stock and having an upwardly projecting wall extending into and movably disposed in the annular space formed between the cylindrical body and the said core, and a ratchet-mechanism co-operating with said core and the said stock and controlled by said setting sleeve.

2. A tool-holder of the character herein set forth, comprising a main cylindrical body formed near its upper end-portion with oppositely located screw-threaded openings, a core fitted within said body, said core being provided with a centrally disposed and longitudinally extending duct and a lower reduced portion providing with said cylindrical body an annular space, and said core being further provided in its upper portion with laterally extending screw-threaded openings, in alinement with the openings in the cylindrical body for the screwing therein of the screw-threaded portion of an actuating rod, a tool-receiving stock, means within the longitudinally extending duct of said core for operatively connecting the core and the cylindrical body with the tool-receiving stock, a setting sleeve surrounding a portion of said stock and having an upwardly projecting wall extending into and movably disposed in the annular space formed between the cylindrical body and the said core, and a ratchet-mechanism co-operating with said core and the said stock and controlled by said setting sleeve.

3. A tool-holder of the character herein set forth, comprising a main cylindrical body, a core fitted within said body, said core being provided with a centrally disposed and longitudinally extending duct formed with an annular off-set, said core being further provided with a lower reduced portion providing with said cylindrical body an annular space, a tool-receiving stock, a tubular and internally screw-threaded stud extending upwardly from said stock and into the longitudinally extending duct of said core and terminating flush with said annular off-set, a screw screwed into said stud, said screw being provided with a head resting upon the upper end of said stud and upon said annular off-set for operatively connecting the core and the cylindrical body with the tool-receiving stock, a setting sleeve surrounding a portion of said stock and having an upwardly projecting wall extending into and movably disposed in the annular space formed between the cylindrical body and the said core, and a ratchet-mechanism co-operating with said core and the said stock and controlled by said setting sleeve.

4. A tool-holder of the character herein set forth, comprising a main cylindrical body formed near its upper end-portion with oppositely located screw-threaded openings, a core fitted within said body, said core being provided with a centrally disposed and longitudinally extending duct and a lower reduced portion providing with said cylindrical body an annular space, and said core being further provided in its upper portion with laterally extending screw-threaded openings in alinement with the openings in the cylindrical body for the screwing therein of the screw-threaded portion of an actuating rod, a tool-receiving stock, a tubular and internally screw-threaded stud extending upwardly from said stock and into the longitudinally extending duct of said core and terminating flush with said annular off-set, a screw screwed into said stud, said screw being provided with a head resting upon the upper end of said stud and upon said annular off-set for operatively connecting the core and the cylindrical body with the tool-receiving stock, a setting sleeve surrounding a portion of said stock and having an upwardly projecting wall extending into and movably disposed in the annular space formed between the cylindrical body and the said core, and a ratchet-mechanism co-operating with said core and with the said stock and controlled by said setting sleeve.

5. A tool-holder of the character herein set forth, comprising a main cylindrical body, a core, said core being provided with an upper and a lower cylindrical portion snugly fitted within said cylindrical body, and a shank portion between said upper and lower cylindrical portions of the core providing with the wall of the main cylindrical body an annular space, a reduced portion extending from the lower cylindrical portion of the core providing with said main cylindrical body a second annular space, the lower cylindrical portion of the core being provided with a series of longitudinally extending guide-ways, the upper cylindrical portion of the core being provided with correspondingly disposed guide-ducts, and the core being further provided with a centrally disposed and longitudinally extending duct, a tool-receiving stock comprising a cylindrical head formed with an annular flange in engagement with the lower marginal edge of the main cylindrical body and the said head being further provided with a series of upwardly extending ratchet-lugs corresponding in number to the number of guide-ways and guide-ducts, means within the longitudinally extending duct of the core for operatively connecting said core and the main cylindrical body with the head of the tool-receiving stock, a setting sleeve surrounding the head of said stock and having an upwardly projecting wall extending into and movably disposed in the annular space formed between the lower cylindrical portion of the core and the main cylindrical body, ratchet-dogs movably disposed in the above-mentioned guide-ways having lower end-portions adapted to be brought, respectively in pairs, into active engagement with the ratchet-lugs of the head of said tool-receiving stock, stems extending upwardly from said ratchet-dogs across the annular space between the lower and upper cylindrical portions of the core and into the above-mentioned guide-ducts, coil-springs encircling said stems, and means connected with the said setting sleeve for actuating the said ratchet-dogs.

6. A tool-holder of the character herein set forth, comprising a main cylindrical body, a core, said core being provided with an upper and a lower cylindrical portion snugly fitted within said cylindrical body, and a shank-portion between said upper and lower cylindrical portions of the core providing with the wall of the main cylindrical body an annular space, a reduced portion extending from the lower cylindrical portion of the core providing with said main cylindrical body a second annular space, the lower cylindrical portion of the core being provided with a series of longitudinally extending guide-ways, the upper cylindrical portion of the core being provided with correspondingly disposed guide-ducts, and the core being further provided with a centrally disposed and longitudinally extending duct, a tool-receiving stock comprising a cylindrical head formed with an annular flange in engagement with the lower marginal edge of the main cylindrical body and the said head being further provided with a series of upwardly extending ratchet-lugs corresponding in number to the number of guide-ways and guide-ducts, means within the longitudinally extending duct of the core for operatively connecting said core and the main cylindrical body with the head of the tool-receiving stock, a setting sleeve surrounding the head of said stock and having an upwardly projecting wall extending into and movably disposed in the annular space formed between the lower cylindrical portion of the core and the main cylindrical body, ratchet-dogs movably disposed in the above-mentioned guide-ways having lower end-portions adapted to be brought, respectively in pairs, into active engagement with the ratchet-lugs of the head of said tool-receiving stock, stems extending upwardly from said ratchet-dogs across the annular space between the lower and upper cylindrical portions of the core and into the above-mentioned guide-ducts, coil-springs encircling said stems, the above-mentioned upwardly projecting wall of the setting sleeve being formed with oppositely located cam surfaces, and with pairs of oppositely located high-points with a receiving depression between each pair of such high-points, and supporting studs extending from said ratchet-dogs slidably disposed upon said cam-surface.

7. A tool-holder of the character herein set forth, comprising a main cylindrical body formed near its upper end-portion with oppositely located screw-threaded openings, a core, said core being provided with an upper and a lower cylindrical portion snugly fitted within said cylindrical body, said upper cylindrical portion of the core being also provided with laterally extending screw-threaded openings in alinement with the openings in the main cylindrical body for the screwing therein of the screw-threaded portion of an actuating rod, a shank-portion between said upper and lower cylindrical portions of the core providing with the wall of the main cylindrical body an annular space, a reduced portion extending from the lower cylindrical portion of the core providing with said main cylindrical body a second annular space, the lower cylindrical portion of the core being provided with a series of longitudinally extending guide-ways, the upper cylindrical portion of the core being provided with correspondingly disposed guide-ducts, and the core being further provided with a centrally disposed and longitudinally extending duct, a tool-receiving stock comprising a cylindrical head formed with an annular flange in engagement with the lower marginal edge of the main cylindrical body and said head being further provided with a series of upwardly extending ratchet-lugs corresponding in number to the number of guide-ways and guide-ducts, means within the longitudinally extending duct of the core for operatively connecting said core and the main cylindrical body with the head of the tool-receiving stock, a setting sleeve surrounding the head of said stock and having an upwardly projecting wall extending into and movably disposed in the annular space formed between the lower cylindrical portion of the core and the main cylindrical body, ratchet-dogs movably disposed in the above-mentioned guide-ways having lower end-portions adapted to be brought, respectively in pairs, into active engagement with the ratchet-lugs of the head of said tool-receiving stock, stems extending upwardly from said ratchet-dogs across the annular space between the lower and upper cylindrical portions of the core and into the above-mentioned guide-ducts, coil-springs encircling said stems, and means connected with the said setting sleeve for actuating the said ratchet-dogs.

8. A tool-holder of the character herein set forth, comprising a main cylindrical body formed near its upper end-portion with oppositely located screw-threaded openings, a core, said core being provided with an upper and a lower cylindrical portion snugly fitted within said cylindrical body, said upper cylindrical portion of the core being also provided with laterally extending screw-threaded openings in alinement with the openings in the main cylindrical body for the screwing therein of the screw-threaded portion of an actuating rod, a shank-portion between said upper and lower cylindrical portions of the core providing with the wall of the main cylindrical body an annular space, a reduced portion extending from the lower cylindrical portion of the core providing with said main cylindrical body a second annular space, the lower cylindrical portion of the core being provided with a series of longitudinally extending guide-ways, the upper cylindrical portion of the core being provided with correspondingly disposed guide-ducts, and the core being further provided with a centrally disposed and longitudinally extending duct, a tool-receiving stock comprising a cylindrical head formed with an annular flange in engagement with the lower marginal edge of the main cylindrical body and the said head being further provided with a series of upwardly extending ratchet-lugs corresponding in number to the number of guide-ways and guide-ducts, means within the longitudinally extending duct of the core for operatively connecting said core and the main cylindrical body with the head of the tool-receiving stock, a setting sleeve surrounding the head of said stock, and having an upwardly projecting wall extending into and movably disposed in the annular space formed between the lower cylindrical portion of the core and the main cylindrical body, ratchet-dogs movably disposed in the above-mentioned guide-ways having lower end-portions adapted to be brought, respectively in pairs, into active engagement with the ratchet-lugs of the head of said tool-receiving stock, stems extending upwardly from said ratchet-dogs across the annular space between the lower and upper cylindrical portions of the core and into the above-mentioned guide-ducts, coil-springs encircling said stems, the above-mentioned upwardly projecting wall of the setting sleeve being formed with oppositely located cam-surfaces, and with pairs of oppositely located high-points with a receiving depression between each pair of such high-points and supporting studs extending from said ratchet-dogs slidably disposed upon said cam-surfaces.

9. A tool-holder of the character herein set forth, comprising a main cylindrical body, a core, said core being provided within an upper and a lower cylindrical portion snugly fitted with said cylindrical body, and a shank-portion between said upper and lower cylindrical portions of the core providing with the wall of the main cylindrical body an annuar space, a reduced portion extending from the lower cylindrical portion of the core providing with said main cylindrical body a second annular space, the lower cylindrical portion of the core being provided with a series of longitudinally extending guide-ways, the upper cylindrical portion of the core being provided with correspondingly disposed guide-ducts, and the core being further provided with a centrally disposed and longitudinally extending duct formed with an annular off-set, a tool-receiving stock comprising a cylindrical head formed with an annular flange in engagement with the lower marginal edge of the main cylindrical body and the said head being further provided with a series of upwardly extending ratchet-lugs corresponding in number to the number of guide-ways and guide ducts, a tubular and internally screw-threaded stud extending upwardly from the head of said stock and into the longitudinally extending duct of said core and terminating flush with said annular offset, a screw screwed into said stud, said screw being provided with a head resting upon the upper end of said stud and upon said annular offset for operatively connecting the core and the main cylindrical body with the head of the tool-receiving stock, a setting sleeve surrounding the head of said stock and having an upwardly projecting wall extending into and movably disposed in the annular space formed between the lower cylindrical portion of the core and the main cylindrical body, ratchet-dogs movably disposed in the above-mentioned guide-ways having lower end-portions adapted to be brought, respectively in pairs, into active engagement with the ratchet-lugs of the head of said tool-receiving stock, stems extending upwardly from said ratchet-dogs across the annular space between the lower and upper cylindrical portions of the core and into the above-mentioned guide-ducts, coil-springs encircling said stems, and means connected with said setting sleeve for actuating the said ratchet-dogs.

10. A tool-holder of the character herein set forth, comprising a main cylindrical body, a core, said core being provided with an upper and a lower cylindrical portion snugly fitted within said cylindrical body, and a shank-portion between said upper and lower cylindrical portions of the core providing with the wall of the main cylindrical body an annular space, a reduced portion extending from the lower cylindrical portion of the core providing with said main cylindrical body a second annular space, the lower cylindrical portion of the core being provided with a series of longitudinally extending guide-ways, the upper cylindrical portion of the core being provided with correspondingly disposed guide-ducts, and the core being further provided with a centrally disposed and longitudinally extending duct formed with an annular off-set, a tool-receiving stock comprising a cylindrical head formed with an annular flange in engagement with the lower marginal edge of the main cylindrical body and the said head being further provided with a series of upwardly extending ratchet-lugs corresponding in number to the number of guide-ways and guide-ducts, a tubular and internally screw-threaded stud extending upwardly from the head of said stock and into the longitudinally extending duct of said core and terminating flush with said annular off-set, a screw screwed into said stud, said screw being provided with a head resting upon the upper end of said stud and upon said annular off-set for operatively connecting the core and the main cylindrical body with the head of the tool-receiving stock, a setting sleeve surrounding the head of said stock and having an upwardly projecting wall extending into and movably disposed in the annular space formed between the lower cylindrical portion of the core and the main cylindrical body, ratchet-dogs movably disposed in the above-mentioned guide-ways having lower end-portions adapted to be brought, respectively in pairs, into active engagement with the ratchet-lugs of the head of said tool-receiving stock, stems extending upwardly from said ratchet-dogs across the annular space between the lower and upper cylindrical portions of the core and into the above-mentioned guide-ducts, coil-springs encircling said stems, the above-mentioned upwardly projecting wall of the setting sleeve being formed with oppositely located cam-surfaces, and with pairs of oppositely located high-points with a receiving depression between each pair of such high-points, and supporting studs extending from said ratchet-dogs slidably disposed upon said cam-surfaces.

In testimony, that I claim the invention set forth above I have hereunto set my hand this 4th day of June, 1923.

EDMOND VERSTRAETE.

Witnesses:
Eva E. Desch,
Fredk. C. Fraentzel.